(12) United States Patent
Ramzan et al.

(10) Patent No.: US 8,799,494 B1
(45) Date of Patent: Aug. 5, 2014

(54) APPLICATION STREAMING PROACTIVE FAILOVER

(75) Inventors: Zulfikar Ramzan, Cupertino, CA (US); Sourabh Satish, Fremont, CA (US); Brian Hernacki, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 541 days.

(21) Appl. No.: 12/025,590

(22) Filed: Feb. 4, 2008

(51) Int. Cl.
*G06F 15/16* (2006.01)
*H04L 29/08* (2006.01)
*G06F 17/30* (2006.01)

(52) U.S. Cl.
CPC ............. *H04L 67/2847* (2013.01); *H04L 67/36* (2013.01); *G06F 17/30132* (2013.01)
USPC ............................................. 709/231; 714/48

(58) Field of Classification Search
CPC ... H04L 41/06; H04L 41/686; H04L 41/0813; H04L 41/0876; H04L 41/0886; H04L 41/5061; H04L 41/507; H04L 41/509; H04L 43/06; H04L 43/067; H04L 67/2861; H04L 67/125; H04L 67/143; H04L 67/145; H04L 67/16; H04L 67/22; H04L 67/26; H04L 67/2847; H04L 67/2852; H04L 67/32; H04L 67/34; H04L 67/36; H04L 65/1083; G06F 17/30132; G06F 17/30029
USPC ................. 709/201–203, 217, 219, 223–225, 709/231–232, 234, 240; 717/168–169, 717/171–178; 725/25, 29, 97; 714/1, 24, 714/48, 708
See application file for complete search history.

(56) References Cited

U.S. PATENT DOCUMENTS

| | | | |
|---|---|---|---|
| 5,999,526 A * | 12/1999 | Garland et al. ............... | 370/352 |
| 6,002,340 A * | 12/1999 | Smith ............................. | 340/3.4 |
| 6,169,881 B1 * | 1/2001 | Astrom et al. ............... | 455/12.1 |
| 6,311,221 B1 * | 10/2001 | Raz et al. ...................... | 709/231 |
| 6,591,290 B1 * | 7/2003 | Clarisse et al. ............... | 709/205 |
| 6,615,166 B1 * | 9/2003 | Guheen et al. ................. | 703/27 |
| 6,959,320 B2 * | 10/2005 | Shah et al. .................... | 709/203 |
| 8,582,584 B2 * | 11/2013 | Rieger et al. ................. | 370/401 |
| 2001/0034736 A1 * | 10/2001 | Eylon et al. ................... | 707/200 |
| 2002/0083183 A1 * | 6/2002 | Pujare et al. ................. | 709/231 |
| 2002/0087963 A1 * | 7/2002 | Eylon et al. ................... | 717/174 |
| 2002/0091763 A1 * | 7/2002 | Shah et al. .................... | 709/203 |
| 2002/0152305 A1 * | 10/2002 | Jackson et al. ................ | 709/224 |
| 2002/0157089 A1 * | 10/2002 | Patel et al. .................... | 717/178 |
| 2003/0140160 A1 * | 7/2003 | Raz et al. ....................... | 709/231 |
| 2004/0003042 A1 * | 1/2004 | Horvitz et al. ............... | 709/204 |
| 2004/0071090 A1 * | 4/2004 | Corson et al. ................ | 370/244 |
| 2004/0186733 A1 * | 9/2004 | Loomis et al. ............... | 704/278 |

(Continued)

*Primary Examiner* — Saleh Najjar
*Assistant Examiner* — Eric W Shepperd
(74) *Attorney, Agent, or Firm* — Brill Law Office; Jeffrey Brill

(57) ABSTRACT

A streaming server which streams an application to a client computer ("endpoint"), as well as the client on which the streamed application runs, makes predictions as to what sections of the application the client is likely to execute in the future. Upon receipt of an indication (e.g., from a system administrator) of a planned service outage of the server or the network, the server transmits the application content that is predicted to be needed by the client during the outage in order to continue executing the application without interruption. The client receives and caches the content. Provided that the prediction is sufficiently accurate, the client can continue to seamlessly execute the application during the service outage.

17 Claims, 1 Drawing Sheet

(56) References Cited

U.S. PATENT DOCUMENTS

| | | | |
|---|---|---|---|
| 2006/0123387 A1* | 6/2006 | Shim et al. ................... | 717/100 |
| 2007/0226810 A1* | 9/2007 | Hotti .............................. | 726/30 |
| 2008/0288321 A1* | 11/2008 | Dillon et al. .................... | 705/9 |

* cited by examiner

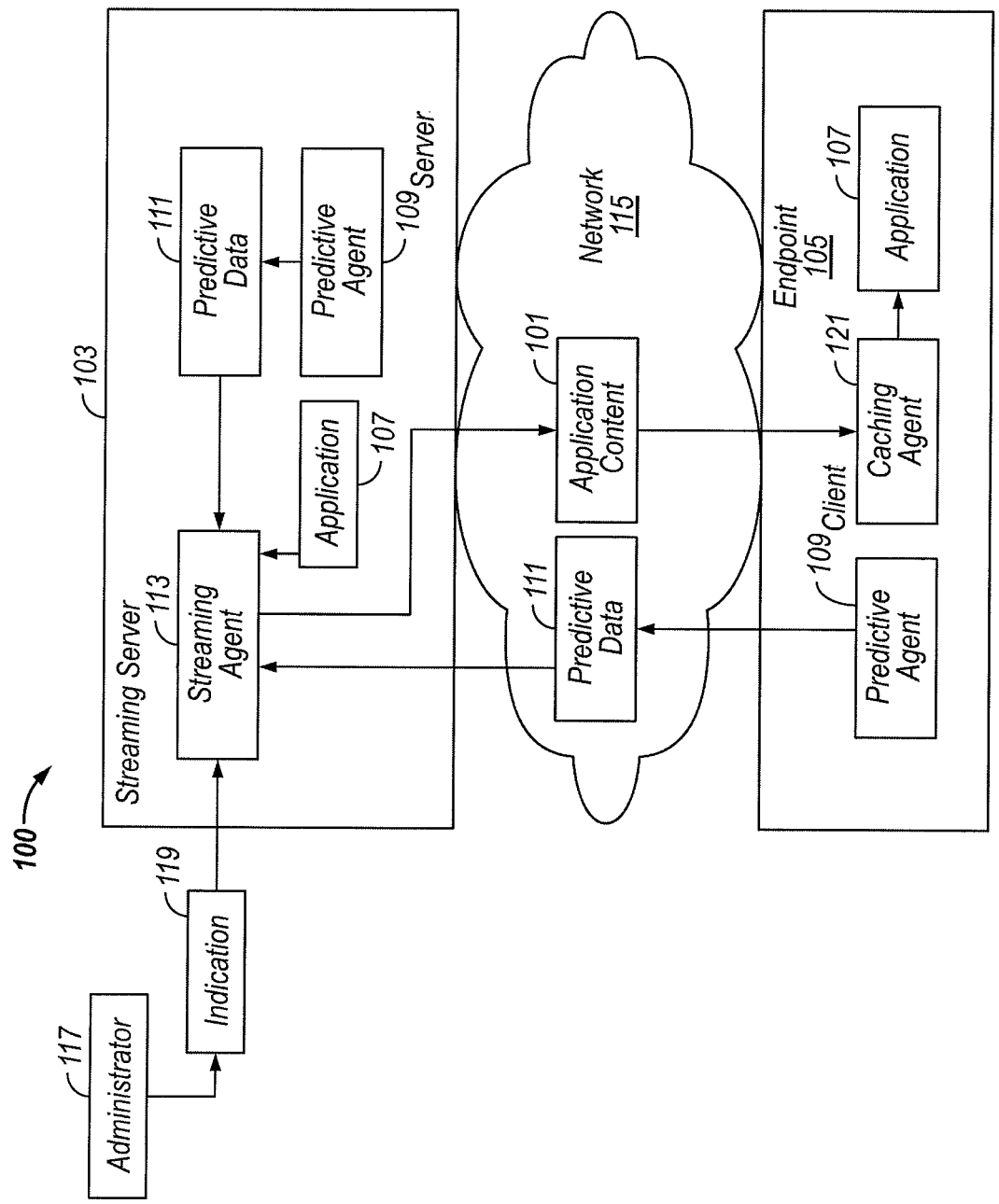

APPLICATION STREAMING PROACTIVE FAILOVER

TECHNICAL FIELD

This invention pertains generally to application streaming technology, and more specifically to adapting application streaming to proactively manage planned disruptions.

BACKGROUND

Application streaming provides the ability for an endpoint (e.g., a client computer) to run an application locally that is stored remotely, for example on a server. The server transmits specific portions of the application (e.g., code pages) to the endpoint, as the endpoint needs them. Application streaming offers a number of advantages over running the application on the server. Streaming the application allows the application to execute locally on the endpoint, instead of remotely on the server. This eliminates the need for large farms of servers to provide applications to a plurality of client computers. Application response time to the user is also significantly faster when the application is run locally on the endpoint, as opposed to remotely on the server. Commercial application streaming technology exists today.

Because the application content is streamed from a server to a client via a network, application streaming is dependent upon the availability of the server and network. However, servers and networks sometimes require maintenance (e.g., server replacement, network switch over, etc.) which require that they be temporarily taken out of service. When the network or the server need to undergo any temporary disruption, this has the effect of termination or pausing of any corresponding streamed applications on the endpoint. This is clearly not desirable.

It would be desirable to be able to be able to adapt application streaming to proactively manage planned outages of the server or network.

SUMMARY

A streaming server which streams an application to a client computer ("endpoint"), as well as the client on which the streamed application runs, makes predictions as to what sections of the application the client is likely to execute in the future. Upon receipt of an indication (e.g., from a system administrator) of a planned service outage of the server or the network, the server transmits the application content that is predicted to be needed by the client during the outage in order to continue executing the application without interruption. The client receives and caches the content. Provided that the prediction is sufficiently accurate, the client can continue to seamlessly execute the application during the service outage.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating a system for adapting application streaming to proactively manage planned service disruptions, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for adapting application streaming to proactively manage planned service disruptions, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, application content 101 is streamed from a server 103 to an endpoint 105, such that the streamed application 107 is executed on the endpoint 105. In addition to standard application streaming functionality, a predictive agent 109 predicts what application content (e.g., code pages and appropriate metadata) 101 the endpoint 105 is likely to execute in the future. A variety of techniques are known to those of ordinary skill in the relevant art for predicting a path of execution. For example, this can be done both through call graph analysis within local code pages 101, through historical profiling of the application 107, and by maintaining per client 105 usage history of the application 107. The implementation mechanics of such execution prediction methodologies are known to those of ordinary skill in the relevant art, and the use thereof within the context of the present invention will be readily apparent those of such a skill level in light of this specification.

As illustrated, a predictive agent $109_{client}$ can run on the client 105, and assist in predicting what code pages 101 may be needed for execution of the application 107 in the future, as described above. The resulting predictive information 111 is transmitted to the server 103, either upon request or periodically.

A predictive agent $109_{server}$ can also perform a similar function on the server 103. The resulting predictive information 111 can be combined with predictive data 111 from the client 105, to create a prediction of what code pages 101 are likely to be needed for the continuing execution of the application 107 on the endpoint 105. It is to be understood that it is a design choice whether to gather predictive data 111 on the client 105, the server 103 or both. As will be readily apparent to one of ordinary skill in the art in light of this specification, some types of data 111 are most efficiently gathered at the client end 105 (e.g., historical profiling of the execution of the application 107 on that client 105), some at the server end 103 (e.g., maintaining per client 105 usage history of the application 107 for a plurality of clients 105) and some can be effectively performed at either location (e.g., call graph analysis). As noted, which analysis to perform at which location is a variable design parameter.

Armed with information 111 concerning what code pages 101 a streamed application 107 is likely to execute in the future, a streaming agent 113 on the server 103 can adjust its streaming of that application 107 to prepare for planned outages of the server 103 or network 115. System administrators 117 and the like are often aware of server 103 or network 115 service interruptions ahead of time. In such cases the administrator 117 can send an appropriate indication 119 to the streaming agent 113 that an interruption is to take place at a given time, with an estimate of the duration. The relevant predictive data 111 is used to make an estimate of what code 101 will be needed by the endpoint 105 for execution during the service outage. The streaming agent 113 pushes that code 101 from the server 103 to the client 105, before the outage occurs. Once the server 103 and/or network 115 is returned to service, the streaming agent 113 can resynchronize with the client 105.

It is to be understood that the predictive analysis can be used to determine a plurality of potential execution paths for the application 107. For example, suppose the execution of a streamed code page 101 presents the user with a menu with three choices. In this example, hypothesize that the predictive analysis determines that the first of the three choices is never selected, but that it is equally likely that the user will select either the second choice or the third choice on the menu. Thus, although it would not be desirable to stream the code 101 for the execution for all three possible execution paths, it would be desirable to stream the code pages 101 associated with both the second and third choices, to ensure that the endpoint 105 has the code it needs. Additionally, it is to be understood that the predictive analysis typically takes into account the estimated length of time of the outage (this information is provided in the outage indication 119, as discussed above). If the outage is to be short, the predictive analysis need not traverse the potential paths of execution too deeply. However, if the outage is to last a long time, code pages 101 traversing far deeper into the various potential execution paths are streamed.

More specifically, as illustrated in FIG. 1, a streaming agent 113 on the server 103 adjusts how application content 101 is sent to the endpoint 105, responsive to receiving an indication 119 of an upcoming service outage. Rather than simply pushing a stream of code pages 101 to the client 105 as usual, the streaming agent 113 proactively sends additional application content 101 based on the predictive profile 111 discussed above. Code pages 101 to send proactively are selected based on likelihood of their execution by the endpoint 105 during the service outage. In other words, the streaming agent 113 sends the client 105 the code 101 the client 105 is predicted to execute during the outage, based on the predictive data 1111 for the client 105. The client 105 caches this application content 101 as described below, for possible execution during the service outage. If the prediction is sufficiently accurate, the endpoint 105 has all the application content 101 it needs to continue seamlessly executing the application 107 during the outage. If the client 105 needs to execute code 101 it does not have, it can fall back to its normal failure mode, and terminate or suspend execution of the application 107 until the server 103 and/or network 115 is back online.

As FIG. 1 illustrates, a caching agent 121 runs on the endpoint 105. Above and beyond standard streaming application endpoint 105 caching functionality, the caching agent 121 is configured to handle a dynamic cache range. Instead of simply handling a static amount of "linear" cache, the agent 101 handles a dynamic amount of "branching" cache. More specifically, because it is not known precisely which code pages 101 will be executed by the endpoint 105 during the service outage, the caching agent 121 has the capacity to store a variable amount of application content (code pages) 101. Additionally, for this same reason, the caching agent 121 is configured to store multiple possible code pages 101 without positive indication of which pages 101 will actually be executed. This way, the various code pages 101 that have been predicted to be executed during the service outage are cached and available to the endpoint 105. As noted above, provided that the estimate is sufficiently accurate, the endpoint 105 has all the application content 101 required to continue executing the application 107 during the outage. The implementation mechanics of the above described caching functionality are known to those of ordinary skill in the relevant art, and the use thereof within the context of the present invention will be readily apparent to those of such a skill level in light of this specification.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for adjusting streaming of an application to proactively manage planned service disruptions, the method comprising the steps of:

streaming code pages of an executable application from a server to an endpoint for execution of the executable application being streamed by the endpoint;

performing predictive analysis to determine, in advance, which specific code pages of the executable application are most likely to be executed by the endpoint;

receiving an indication, in advance, of a planned service disruption affecting streaming of code pages of the executable application to the endpoint, said indication indicating start time and duration of the service disruption in advance;

predicting which specific code pages of the executable application are most likely to be executed by the endpoint during the planned service disruption based on the performed predictive analysis, said specific code pages of the executable application predicted to most likely be executed by the endpoint during the planned service disruption comprising a subset of a plurality of potential execution paths of the executable application; and proactively streaming, prior to the planned service disruption, the specific code pages of the executable application predicted to most likely be executed by the endpoint during the planned service disruption to the endpoint, for uninterrupted execution of the executable application by the endpoint during the planned service disruption, said subset of a plurality of potential execution paths comprising a plurality of potential execution paths predicted to most likely be executed by the endpoint during planned service disruption, and wherein performing predictive analysis to determine, in advance, which specific code pages of the executable application are most likely to be executed by the endpoint further comprises performing a group of steps consisting of:

performing, by the endpoint, at least some analysis to predict a plurality of potential execution paths for the executable application and transmitting resultant predictive data to the server;

receiving predictive data predicting a plurality of potential execution paths for the executable application from the endpoint; and performing, by the server, at least some analysis to predict a plurality of potential execution paths for the executable application.

2. The method of claim 1 wherein performing predictive analysis to determine, in advance, which specific code pages of the executable application are most likely to be executed by the endpoint further comprises performing at least one step from a group of steps consisting of:

performing call graph analysis of the application;

performing historical profiling of execution of the application on the endpoint; and maintaining per client usage history of the application for a plurality of clients.

3. The method of claim 1 wherein receiving an indication of a planned service disruption affecting streaming of code pages of the executable application to the endpoint further comprises performing a step from a group of steps consisting of:

receiving an indication of a planned server service outage, said indication of a planned server service outage indicating time and duration information concerning the service outage; and receiving an indication of a planned network service outage, said indication of a planned network service outage indicating time and duration information concerning the service outage.

4. The method of claim 1 wherein proactively streaming, prior to the planned service disruption, the specific code pages of the executable application predicted to most likely be executed by the endpoint during the planned service disruption to the endpoint further comprises:

transmitting to the endpoint code pages and associated metadata predicted to be needed for uninterrupted execution of the application by the endpoint during the planned service disruption.

5. The method of claim 1 further comprising:

dynamically caching proactively streamed, predicted code pages of the executable application, by the endpoint, for execution during the planned service disruption.

6. The method of claim 1 further comprising: executing at least some proactively streamed, predicted code pages of the executable application, by the endpoint, during the planned service disruption.

7. At least one non-transitory computer readable medium containing a computer program product for adjusting streaming of an application to proactively manage planned service disruptions, the computer program product comprising:

program code for streaming code pages of an executable application from a server to an endpoint for execution of the executable application being streamed by the endpoint;

program code for performing predictive analysis to determine, in advance, which specific code pages of the executable application are most likely to be executed by the endpoint;

program code for receiving an indication, in advance, of a planned service disruption affecting streaming of code pages of the executable application to the endpoint, said indication indicating start time and duration of the service disruption in advance;

program code for predicting which specific code pages of the executable application are most likely to be executed by the endpoint during the planned service disruption based on the performed predictive analysis, said specific code pages of the executable application predicted to most likely be executed by the endpoint during the planned service disruption comprising a subset of a plurality of potential execution paths of the executable application; and program code for proactively streaming, prior to the planned service disruption, the specific code pages of the executable application predicted to most likely be executed by the endpoint during the planned service disruption to the endpoint for uninterrupted execution of the executable application by the endpoint during the planned service disruption, said subset of a plurality of potential execution paths comprising a plurality of potential execution paths predicted to most likely be executed by the endpoint during the planned service disruption, and wherein the program code for performing predictive analysis to determine, in advance, which specific code pages of the executable application are most likely to be executed by the endpoint further comprises program code for performing a group of steps consisting of:

performing, by the endpoint, at least some analysis to predict a plurality of potential execution paths for the executable application and transmitting resultant predictive data to the server;

receiving predictive data predicting a plurality of potential execution paths for the executable application from the endpoint; and performing, by the server, at least some analysis to predict a plurality of potential execution paths for the executable application.

8. The computer program product of claim 7 wherein the program code for performing predictive analysis to determine, in advance, which specific code pages of the executable application are most likely to be executed by the endpoint further comprises program code for performing at least one step from a group of steps consisting of:

performing call graph analysis of the application;

performing historical profiling of execution of the application on the endpoint; and maintaining per client usage history of the application for a plurality of clients.

9. The computer program product of claim 7 wherein the program code for receiving an indication of a planned service disruption affecting streaming of code pages of the executable application to the endpoint further comprises program code for performing a step from a group of steps consisting of:
- receiving an indication of a planned server service outage, said indication of a planned server service outage indicating time and duration information concerning the service outage; and
- receiving an indication of a planned network service outage, said indication of a planned network service outage indicating time and duration information concerning the service outage.

10. The computer program product of claim 7 wherein the program code for proactively streaming, prior to the planned service disruption, the specific code pages of the executable application predicted to most likely be executed by the endpoint during the planned service disruption to the endpoint further comprises:
- program code for transmitting to the endpoint code pages and associated metadata predicted to be needed for uninterrupted execution of the application by the endpoint during the planned service disruption.

11. The computer program product of claim 7 further comprising:
- program code for dynamically caching proactively streamed, predicted code pages of the executable application, by the endpoint, for execution during the planned service disruption.

12. The computer program product of claim 8 further comprising:
- program code for executing at least some proactively streamed, predicted code pages of the executable application, by the endpoint, during the planned service disruption.

13. A computer system for adjusting streaming of an application to proactively manage planned service disruptions, the computer system comprising:
- means for streaming code pages of an executable application from a server to an endpoint for execution of the executable application being streamed by the endpoint;
- means for performing predictive analysis to determine, in advance, which specific code pages of the executable application are most likely to be executed by the endpoint;
- means for receiving an indication, in advance, of a planned service disruption affecting streaming of code pages of the executable application to the endpoint, said indication indicating start time and duration of the service disruption in advance;
- means for predicting which specific code pages of the executable application are most likely to be executed by the endpoint during the planned service disruption based on the performed predictive analysis, said specific code pages of the executable application predicted to most likely be executed by the endpoint during planned service disruption comprising a subset of a plurality of potential execution paths of the executable application; and
- means for proactively streaming, prior to the planned service disruption, the specific code pages of the executable application predicted to most likely be executed by the endpoint during the planned service disruption to the endpoint for uninterrupted execution of the executable application by the endpoint during the planned service disruption, said subset of a plurality of potential execution paths comprising a plurality of potential execution paths predicted to most likely be executed by the endpoint during the planned service disruption, and
- wherein the means for performing predictive analysis to determine, in advance, which specific code pages of the executable application are most likely to be executed by the endpoint further comprise means for performing a group of steps consisting of:
  - performing, by the endpoint, at least some analysis to predict a plurality of potential execution paths for the executable application and transmitting resultant predictive data to the server;
  - receiving predictive data predicting a plurality of potential execution paths for the executable application from the endpoint; and
  - performing, by the server, at least some analysis to predict a plurality of potential execution paths for the executable application.

14. The computer system of claim 13 wherein the means for performing predictive analysis to determine, in advance, which specific code pages of the executable application are most likely to be executed by the endpoint further comprise means for performing at least one step from a group of steps consisting of:
- performing call graph analysis of the application;
- performing historical profiling of execution of the application on the endpoint; and
- maintaining per client usage history of the application for a plurality of clients.

15. The computer system of claim 13 wherein the means for receiving an indication of a planned service disruption affecting streaming of code pages of the executable application to the endpoint further comprise means for performing a step from a group of steps consisting of:
- receiving an indication of a planned server service outage, said indication of a planned server service outage indicating time and duration information concerning the service outage; and
- receiving an indication of a planned network service outage, said indication of a planned network service outage indicating time and duration information concerning the service outage.

16. The computer system of claim 13 wherein the means for proactively streaming, prior to the planned service disruption, the specific code pages of the executable application predicted to most likely be executed by the endpoint during the planned service disruption to the endpoint further comprises:
- means for transmitting to the endpoint code pages and associated metadata predicted to be needed for uninterrupted execution of the application by the endpoint during the planned service disruption.

17. The computer system of claim 13 further comprising:
- means for dynamically caching proactively streamed, predicted code pages of the executable application, by the endpoint, for execution during the planned service disruption.

* * * * *